Dec. 18, 1962 R. L. SKINNER 3,069,174
SEAL
Filed Feb. 5, 1959
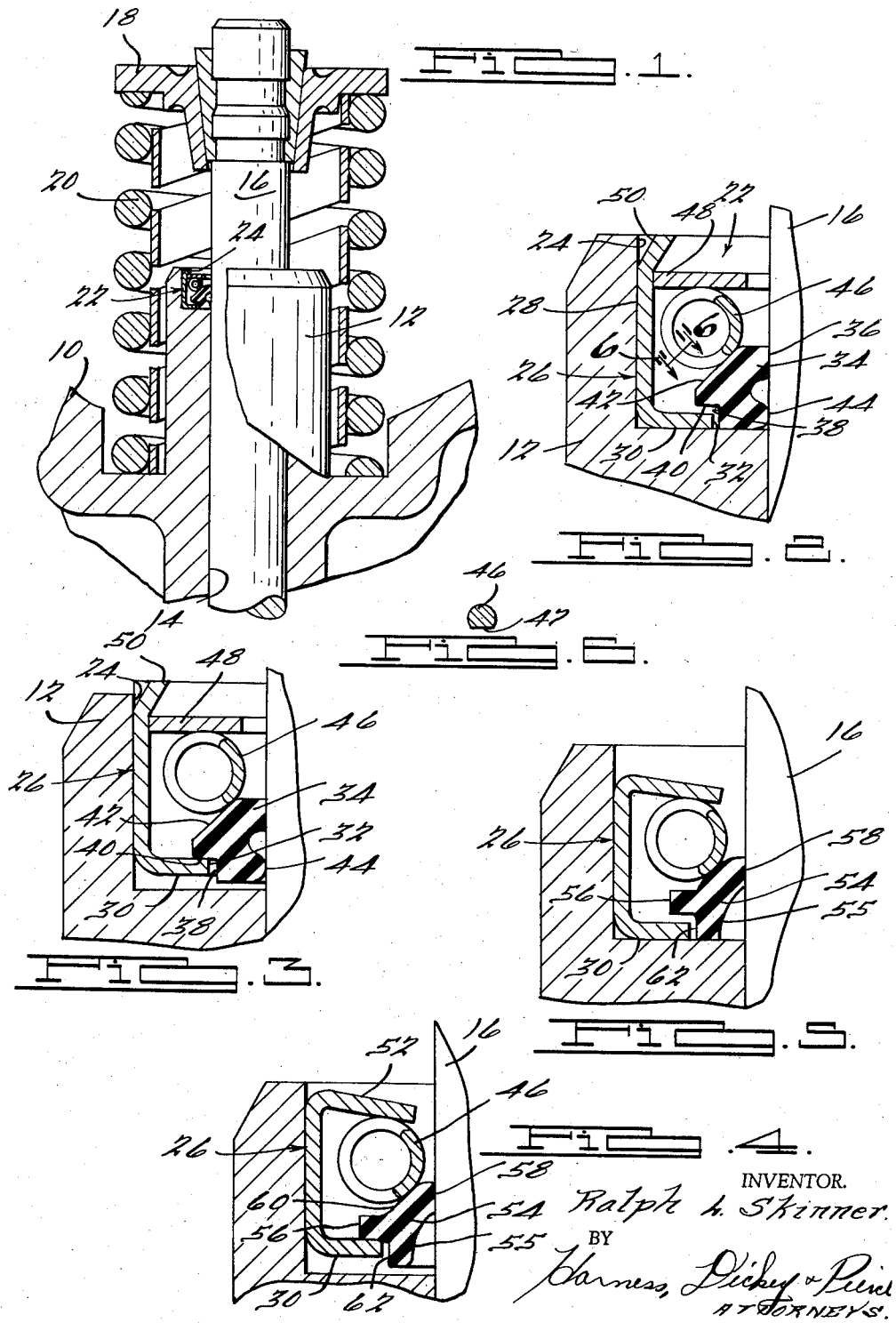
INVENTOR.
Ralph L. Skinner.
BY
Harness, Dickey & Pierce
ATTORNEYS.

United States Patent Office 3,069,174
Patented Dec. 18, 1962

3,069,174
SEAL
Ralph L. Skinner, North Hollywood, Calif., assignor of one-half to Robert T. Skinner, Flint Ridge, Calif.
Filed Feb. 5, 1959, Ser. No. 791,304
3 Claims. (Cl. 277—48)

This invention relates to seals for reciprocating and rotating shafts, and particularly to a seal for the valve stem of an internal combustion engine.

In an internal combustion engine the valve stem of each intake and exhaust valve is slidably mounted in the head of the engine with the valve head on the end thereof projecting within the combustion chamber and the other end projecting outwardly in position to be actuated by the conventional rocker arm. During the intake cycle of the engine a reduced pressure is created in the cylinder which tends to suck the oil lubricating the rocker arms around each valve stem and into the combustion chamber where it is burned.

It is one object of the invention to provide an improved seal for a valve stem of the type described to prevent oil from being sucked into the combustion chamber.

It is another object of the invention to provide an improved seal for rotating and reciprocating shafts or rods in general.

It is a further object of the invention to provide a seal having a low friction sealing ring therein which is urged against the shaft or rod to be sealed with a predetermined force.

It is a still further object of the invention to provide a sealing ring of low friction material having a cross-sectional configuration that enables it to cooperate with a housing in which it is enclosed in a manner to provide a more effective seal for a rotating or reciprocating shaft.

It is a still further object of the invention to provide a sealing ring of low friction material which is adapted to be disposed within a cup-shaped housing in a manner to cooperate with a garter spring disposed within the housing so as to be urged into sealing relationship with a shaft under a predetermined force exerted thereon by the garter spring.

Other objects, features and advantages of the present invention will become apparent from the following detailed description taken in conjunction with the accompanying drawings, in which:

FIGURE 1 is a fragmentary sectional view of a valve stem slidably mounted in the head of an overhead valve internal combustion engine;

FIG. 2 is an enlarged fragmentary view of the seal element illustrated in FIG. 1;

FIG. 3 is a view similar to that of FIG. 2 illustrating the seal element with the parts thereof in the position they occupy before the seal is completely seated;

FIG. 4 is a view similar to that of FIG. 3 illustrating a modification of the seal element;

FIG. 5 is a view similar to that of FIG. 4 with the sealing element illustrated in its completely seated position; and FIG. 6 is an enlarged sectional view of one of the convolutions of the garter spring taken along the line 6—6 of FIG. 2.

Although the seal element of the present invention can be used to provide a seal for rotating and reciprocating shafts in general, it is particularly useful for sealing the valve stems of the intake and exhaust valves of an overhead valve internal combustion engine, and therefore, the preferred form of the seal element will be described as used in such an overhead valve engine.

Referring to FIG. 1, one type of conventional overhead valve engine comprises a head 10 having a cylindrical portion 12 formed thereon with an aperture 14 extending therethrough to slidably receive a valve stem 16. The lower end (not shown) of the valve stem 16 would, of course, project into the combustion chamber and have the valve head formed thereon, and the upper end thereof carries a flanged head 18 against which a spring 20 acts to continuously urge the valve stem 16 upwardly to normally seat the valve head on the lower end thereof. Of course, the upper end of the valve stem is adapted to be actuated by the conventional rocker arm to open and close the valve and, since lubricating oil is generally introduced around the rocker arms, the upper end of the valve stem is also exposed to oil.

To prevent the oil from being sucked into the combustion chamber a seal element 22 is disposed about the valve stem 16 within a counterbore 24 in the upper end of the cylindrical portion 12. The preferred form of the sealing element 22 is most clearly illustrated in FIG. 2 and comprises a cup-shaped housing 26 having a cylindrical wall portion 28 and a washer-shaped bottom portion 30 having a central aperture 32 therein.

A sealing ring 34 of low friction material is disposed within the cup-shaped element 26 with sealing face 36 thereof in position to engage the valve stem 16. There are a number of low friction materials that the satisfactory, such as nylon, but in the preferred embodiment of the present invention Teflon is used because of its superior low friction characteristics, and resistance to heat and corrosion.

It will be observed that the sealing ring 34 has an annular portion 38 depending therefrom which has a reduced outside diameter to provide a shoulder 40 that overlaps the washer-shaped bottom portion 30 of the cup-shaped element 26 with the annular depending portion 38 extending through the aperture 32. The radially outer surface of the sealing ring 34 is formed with a sloping portion 42 and an annular lip 44 is formed below the sealing face 36.

A garter spring 46 or the like is retained within the cup-shaped element 26 in engagement with the sloping portion 42 of the sealing ring by a washer 48 which in turn is retained by crimped portions 50 on the upper edge of the cylindrical wall portion 28 of the cup-shaped element. The garter spring 46 exerts a predetermined force on the sealing ring 34 to urge the sealing face 36 into sealing engagement with the valve stem 16. The annular lip 44 prevents the sealing ring from cocking to insure that the entire sealing face 36 engages the valve stem 16 rather than only a portion thereof which might occur if the sealing ring were cocked by the pressure of the garter spring 46. Of course, the annular lip 44 may also be considered as providing a second sealing face engaging the valve stem 16.

Referring to FIG. 3, the seal element 22 is illustrated in the counterbore 24 with the parts thereof in the position they normally assume before the seal element is completely seated. It will be observed that the annular depending portion 38 not only extends through the aperture 32 but projects beyond the outside surface of the washer-shaped bottom portion 30 a distance determined by the shoulder 40 which rests upon the inside surface of the washer-shaped bottom portion. With the sealing ring 34 in this axial position relative to the cup-shaped element 26, the garter spring 46 will, of course, engage the sloping portion 42 of the sealing ring at a higher posiiton as illustrated.

As best seen in FIG. 2, the sealing ring 34 is concurrently biased both axially downwardly and radially inwardly with respect to the housing 26 by the spring 46 to effect a seal against the lower end of the counterbore 24 and with the valve stem 16, respectively.

An important feature of the present invention is to make the size of the garter spring 46 as accurate as possible so that when it is in the position illustrated in FIG. 3 it will not be expanded radially and will not exert any force on the sealing ring 34. Further, the slope of the sloping portion 42 and the distance which the annual depending portion 38 projects beyond the bottom of the washer-shaped portion 30 are related so that when the cup-shaped element 26 is completely seated, as illustrated at FIG. 2, the sealing ring 34 is pushed upwardly to a second axial position wherein the bottom of the annular portion 38 is flush with the bottom of the cup-shaped element 26, and the garter spring 46 is expanded radially outwardly by the sloping portion 42 so that it urges the sealing ring 34 into sealing engagement with the valve stem 16 with a predetermined maximum force.

As stated previously, there are a number of low friction materials which are suitable for use as the sealing ring 34, but Teflon is preferred because of its extremely fine low friction characteristics and high heat resistance. When Teflon is employed, the teaching of the present invention wherein the maximum force exerted by the garter spring 46 is determined by the movement of the sealing ring from the axial position illustrated in FIG. 3 to the axial position illustrated in FIG. 2 is extremely advantageous since if the force exerted by the garter spring 46 is not accurately controlled and is permitted to become too large, the Teflon sealing ring will tend to cold flow and also to wear more rapidly.

Experience has proved that an effective seal of the character described, using Teflon for the sealing ring, can best be obtained by carefully controlling the force exerted by the garter spring as described above. Further, to reduce the tendency of the garter spring to dig into the sloping surface, the garter spring 46 of the preferred embodiment illustrated has the outer surface 47 thereof ground flat, as most clearly illustrated in FIG. 6, to increase the area engaging the sloping portion 42. If the outer surface 47 is not flattened in this manner and the garter spring should dig into the Teflon sealing ring, the maximum force exerted by the garter spring will, of course, fall below the predetermined force at which the seal element is designed to operate.

Referring to FIGS. 4 and 5, a modification of the seal element of the present invention is illustrated wherein the washer 48 is replaced by an inwardly extending flange portion 52 formed by bending over part of the cylindrical wall portion 28 of the cup-shaped element 26. It will be observed that in this embodiment the portion 52 is bent past the horizontal so that it forms an acute angle of approximately 7° with the horizontal. Sloping the portion 52 in this manner enables the garter spring 46 to move upwardly a small amount as it is urged radially outwardly by the wedging action of the modified sealing ring 54. This feature compensates for any excess upward movement of the sealing ring that might occur in the event the annular depending portion projects beyond the bottom of the cup-shaped element a slightly greater amount due to manufacturing inaccuracies. It is apparent that if the sealing ring 54 does move up a slightly greater amount, it will tend to urge the garter spring 46 radially outwardly a proportionally greater amount and tend to increase the force the garter spring exerts on the sealing ring 54. But since the slope of the portion 52 permits the garter spring 46 to move upwardly a small amount as it moves radially outwardly, the garter spring will not expand as much as it normally would if retained by the washer 48 of FIGS. 2 and 3, for example.

In the modified sealing ring 54 the lower portion thereof has been cut away as at 55 to impart some flexibility to the sealing ring 54 so that it can be more effectively urged against the valve stem 16. The sealing ring 54 has a sealing face 58, a sloping portion 60 for wedging the garter spring 46 radially outwardly when moved to the position illustrated in FIG. 4, an annular radially outwardly projecting flange 56 which overlaps the washer-shaped bottom portion 30 of the cup-shaped element 26, and an annular depending portion 62, each of these being similar to their counterparts in the sealing ring 34 and functioning in substantially the same manner.

It will be observed that in each of the embodiments disclosed a small clearance has been provided between the annular depending portion 38 (62 in FIGS. 4 and 5) of the sealing ring and the central aperture 32 to enable the sealing ring to shift laterally relative to the cup-shaped element 26 in a free floating manner. The reason for this is that experience has proved that the tolerance between the valve stem 16 and the aperture 14 (FIG. 1) necessary to permit the valve stem to freely reciprocate may also permit the valve stem to shift laterally a small amount. In fact it is believed that the manner in which the rocker arms actuate the valves by camming against the upper end of the valve stem tends to impart a slight eccentric movement to the valve stem. By providing the aforementioned clearance between the annular depending portion 38 and the central aperture 32, the sealing ring is free to shift with the valve stem without being caught between the valve stem and the wall of the central aperture 32.

The embodiment of FIGS. 4 and 5 is particularly well suited for assisting the free floating of the sealing ring 54 since the sloping portion 52 of the cup-shaped housing 26 in effect minimizes the resistance of the spring 46 to the shifting of the sealing ring. For example, if the valve stem 16 should move slightly to the left as viewed in FIG. 4, it will tend to expand the left side of the spring and consequently the inward force exerted by the spring will increase to some extent since the right side of the spring is not completely free to immediately move to the left because of frictional forces. Since the slope of the portion 52 permits the garter spring 46 to move upwardly a small amount as it moves radially outwardly, as previously described, the spring will not expand as much as it normally would if retained by the washer 48 of FIGS. 2 and 3, for example. Therefore the spring provides less resistance to the movement of the sealing ring to the left. It is also apparent that the slight frusto-conical shape of the flange portion 52 will tend to center the garter spring, and therefore the sealing ring, relative to the central aperture 32 before the valve stem is extended therethrough.

While it will be apparent that the preferred embodiment of the invention herein disclosed is well calculated to fulfill the objects above stated, it will be appreciated that the invention is susceptible to modification, variation and change without departing from the proper scope or fair meaning of the subjoined claims.

What is claimed is:

1. A seal assembly for sealing peripherally against a shaft and axially against a fixed surface adjacent to the shaft comprising an annular housing having spaced upper and lower walls, an annular sealing element in said housing overlying and adapted to be supported by said lower wall and a garter spring in the housing between said sealing element and said upper wall, said sealing element having an inner annular sealing face adapted to seal said shaft, an upwardly and outwardly facing beveled pressure surface around said sealing face adapted to seat and support said garter spring, and a depending annular inner lip portion in and extending through a central aperture in said lower wall, said lip portion projecting below said lower wall and provided with a bottom annular sealing face, and said garter spring being relatively unstressed when said sealing element is supported by said lower wall, said seal assembly adapted to be positioned around said shaft and against said fixed surface and in being so positioned said lip portion adapted to seat on said fixed surface and to lift said sealing element off said lower wall so as to confine and expand said garter spring between said beveled pressure surface and said upper wall, whereby the expanded spring acts on said pressure surface to exert sealing pressure simultaneously on said inner sealing face and said bottom sealing face.

2. The combination as set forth in claim 1 including an annular groove in said inner sealing surface dividing the same into separate upper and lower sealing portions.

3. The combination as set forth in claim 1 wherein said depending lip portion is spaced radially inwardly from the wall of said aperture to permit radial floating movement of said sealing element in said housing.

References Cited in the file of this patent

UNITED STATES PATENTS

| | | |
|---|---|---|
| 1,905,800 | Chandler | Apr. 25, 1933 |
| 1,942,567 | Nelson | Jan. 9, 1934 |
| 2,202,908 | Hubbard | June 4, 1940 |
| 2,804,324 | Stallings | Aug. 27, 1957 |
| 2,838,333 | Wilder | June 10, 1958 |
| 2,868,566 | Kosatka | Jan. 13, 1959 |

FOREIGN PATENTS

| | | |
|---|---|---|
| 879,496 | Germany | June 15, 1953 |